United States Patent [19]
Littke

[11] Patent Number: 5,963,139
[45] Date of Patent: Oct. 5, 1999

[54] FLOW MONITORING SYSTEM FOR PARTICULATE METERING SYSTEM

[75] Inventor: Jerry Littke, Fargo, N. Dak.

[73] Assignee: Case Corporation, Racine, Wis.

[21] Appl. No.: 09/053,185

[22] Filed: Apr. 1, 1998

[51] Int. Cl.[6] ................................................. G08B 21/00
[52] U.S. Cl. ........................... 340/684; 340/521; 111/903
[58] Field of Search ................................. 340/684, 521, 340/679, 691.5, 691.4; 111/903

[56] References Cited

U.S. PATENT DOCUMENTS

| | | | |
|---|---|---|---|
| 3,891,120 | 6/1975 | Loesch et al. | 221/2 |
| 4,085,862 | 4/1978 | Steffen | 221/8 |
| 4,159,064 | 6/1979 | Hood | 221/8 |
| 4,185,224 | 1/1980 | Thompson | 340/684 |
| 4,296,695 | 10/1981 | Quanbeck | 111/34 |
| 4,333,096 | 6/1982 | Jenkins et al. | 340/684 |
| 4,369,895 | 1/1983 | McCarty et al. | 221/3 |
| 4,473,016 | 9/1984 | Gust | 111/86 |
| 4,611,545 | 9/1986 | Nickeson et al. | 111/52 |
| 4,697,173 | 9/1987 | Stokes | 340/684 |
| 4,710,757 | 12/1987 | Haase | 340/684 |
| 4,892,157 | 1/1990 | Gemar | 172/430 |
| 5,533,458 | 7/1996 | Bergland et al. | 111/200 |
| 5,684,476 | 11/1997 | Anderson | 340/988 |

OTHER PUBLICATIONS

Turck Sensors (Excerpts from "Turck Sensors Proximity Sensors"); 7 pages; undated.

*Primary Examiner*—Daniel J. Wu
*Assistant Examiner*—Sihong Huang
*Attorney, Agent, or Firm*—Foley & Lardner

[57] ABSTRACT

A flow monitoring system for a particulate feeder having first and second metering devices that meter particulate material from first and second bins, respectively, to a material flow tube, includes a first sensor supported and configured to generate a first flow signal in response to the absence of particulate material within the first metering device; a second sensor supported and configured to generate a second flow signal in response to the absence of particulate material within the second metering device; a third sensor supported adjacent the first bin and configured to generate a first fill signal indicating a level of particulate material within the first bin; a fourth sensor configured to generate a second fill signal indicating the level of particulate material within the second bin; a controller coupled to a first, second, third and fourth sensors and configured to generate a first alarm signal in response to receiving the first flow signal and a second alarm signal in response to receiving a second flow signal and a notification device coupled to the controller and configured to produce a first alarm in response to the first alarm signal and a second alarm in response to the second alarm signal. Preferably, the controller is configured to generate the first visual display based on the first fill signal and the first flow signal to simultaneously indicate the amount of material within the first bin and whether the material within the first bin is bridging. The controller is also preferably configured to generate a second visual display based on the second fill signal and the second flow signal to simultaneously indicate the amount of material within the second bin and whether the material within the second bin is bridging.

20 Claims, 5 Drawing Sheets

FLOW MONITORING SYSTEM FOR PARTICULATE METERING SYSTEM

FIELD OF THE INVENTION

The present invention relates to flow monitoring systems for particulate metering systems. In particular, the present invention relates to a flow monitoring system which notifies an operator of the cessation of particulate flow from a bin to a particulate material metering device.

BACKGROUND OF THE INVENTION

Particulate feeder systems are used for distributing and metering a wide variety of particulate material, including seed, fertilizer, herbicide and insecticide to the surface of or beneath the ground being worked. Particulate feeder systems typically include a plurality of metering devices which meter particulate material from a plurality of hoppers or bins to one or more particulate material flow tubes. The metering device typically comprises a rotating metering member, such as a flute, which carries particulate material from an outlet of the bin to the inlet of the flow tube. The flow tube carries the particulate material, usually under the force of blown air, to the surface of or beneath the ground being worked. To ensure that particulate material is being metered and distributed to the ground being worked, conventional particulate feeder systems include a flow monitoring system, which includes a sensor mounted within the flow tube to sense the flow of particulate material therethrough. This sensed information is then displayed to the operator.

During the distribution of particulate material to the ground being worked, the particulate material within either one of the bins will often bridge due to a loss of tank pressure or after being exposed to moisture. As a result, the flow of particulate material from the particular bin ceases. However, conventional flow monitoring systems frequently fail to notify the operator of this cessation of flow of particulate material from the bin due to bridging since particulate material from the other bin may be continuing to flow. Moreover, even if such conventional flow monitoring systems do notify the operator of the decrease in material flow through the flow tube, such systems fail to alert the operator as to the cause of the decline in material flow through the flow tube. For example, even if alerted to the decrease in flow through the flow tube, the operator cannot determine whether there is a blockage in the flow tube itself or whether there is a blockage in either one of the metering devices or bins.

Thus, there has been a continuing need for a flow monitoring system which not only alerts the operator of a decrease in flow through the flow tubes but also informs the operator as to the exact cause of the material flow blockage. In addition, there has also been a continuing need for a flow monitoring system that simultaneously indicates to the user the amount or level of particulate material within the bin as well as whether the material within the bin is bridging via a single, visual display signal.

SUMMARY OF THE INVENTION

The present invention is directed to a first flow monitoring system for a particulate feeder having first and second metering devices that meter particulate material from first and second bins, respectively, to a material flow tube. The monitoring system includes a first sensor supported and configured to generate a first flow signal in response to the absence of particulate material within the first metering device, a second sensor supported and configured to generate a second flow signal in response to the absence of particulate material within the second metering device, a controller coupled to the first and second sensors and configured to generate an alarm signal in response to receiving at least one of the first and second flow signals and a notification device coupled to the controller and configured to produce an alarm in response to the alarm signal.

According to one aspect of the first flow monitoring system, a notification device is configured to produce an audible alarm in response to the alarm signal. According to yet another preferred aspect of the first flow monitoring system, a notification device is configured to produce a visual alarm in response to the alarm signal. Preferably, a controller generates a first alarm signal in response to receiving the first flow signal and a second alarm signal in response to receiving the second flow signal, wherein the notification device produces a first alarm in response to the first alarm signal and a second alarm in response to the second alarm signal. According to yet another preferred aspect of the first flow monitoring system, the notification device is configured to produce a visual alarm in response to the alarm signal. Preferably, a controller generates a first alarm signal in response to receiving the first flow signal and a second alarm signal in response to receiving the second flow signal, wherein the notification device produces a first alarm in response to the first alarm signal and a second alarm in response to the second alarm signal. Preferably, the notification device produces a first visual alarm in response to the first flow signal and a second visual alarm in response to the second flow signal.

According to yet another preferred aspect of the first flow monitoring system, the monitoring system includes a third sensor supported adjacent the first bin and configured to generate a first fill signal indicating a level of particulate material within the first bin, wherein the controller is coupled to the third sensor and generates a first visual display based on the first fill signal and the first flow signal to simultaneously indicate the level of material within the first bin whether the material within the first bin is bridging. The system also preferably includes a fourth sensor supported adjacent to the second bin and configured to generate a second fill signal indicating a level of particulate material within the second bin, wherein the controller is coupled to the fourth sensor and generates a second visual display based on the second fill signal and the second flow signal to simultaneously indicate the level of material within the second bin and whether the material within the second bin is bridging. Preferably, the first visual display comprises a lower visual element and at least one upper visual element above the lower visual element. The controller depicts the lower visual element to visually indicate the presence of particulate material within the first metering device and that the material within the first bin is not bridging. The controller depicts said at least one upper visual element to visually indicate the level of particulate material within the first bin.

The present invention is also directed to a second flow monitoring system for a metering system having a first metering device metering particulate material from a first bin to a particulate material flow tube. A second flow monitoring system includes a first sensor supported adjacent the first bin and configured to generate a first fill signal indicating a level of particulate material within the first bin, a second sensor configured to generate a first flow signal in response to the absence of material within the first metering device and a controller coupled to the first and second sensors and configured to generate a single, visual display based on the first fill signal and the first flow signal to simultaneously indicate the amount of material within the first bin and whether the material within the first bin is bridging.

According to one preferred aspect of the second monitoring system, the first visual display comprises a lower visual element and at least one upper visual element above the lower visual element. The controller depicts the lower visual element to visually indicate the presence of particulate material within the first metering device and that the material within the first bin is not bridging. The controller depicts said at least one upper visual element to visually indicate the level of particulate material within the first bin.

The present invention is also directed to a particulate feeder system, including a first bin configured for containing a first particulate material and having a first outlet, a second bin configured for containing a second particulate material and having a second outlet, a particulate flow tube having a first inlet, a second inlet and outlet, a first metering chamber interconnecting the first outlet of the first bin and the first inlet of the tube, a first metering member rotatably supported within the first metering chamber and configured to carry particulate material from the first outlet of the bin to the first inlet of the tube, a second metering chamber interconnecting the second outlet of the second bin and the second inlet of the tube, a second metering member rotatably supported within the second metering chamber and configured to carry a particulate material from the second outlet of the second bin to the second inlet of the tube, a first sensor supported and configured to generate first flow signals in response to the absence of particulate material between the first outlet of the first bin and the first metering member, a second sensor supported and configured to generate second flow signals in response to the absence of particulate material between the second outlet of the second bin and the second metering member, a controller coupled to the first and second sensors and configured to generate an alarm signal in response to receiving at least one of the first and second flow signals and a notification device coupled to the controller and configured to produce an alarm in response to the alarm signals.

According to one aspect of the particulate feeder system, the particulate feeder system includes a third sensor supported adjacent the first bin and configured to generate a first fill signal indicating a level of particulate material within the first bin, the controller is coupled to the third sensor and generates a first visual display based on the first fill signal and the first flow signal to simultaneously indicate the level of material within the first bin and whether the material within the first bin is bridging. Preferably, the first visual display comprises a lower visual element and at least one upper visual element above the lower visual element. The controller depicts the lower visual element to visually indicate the presence of particulate material within the first metering chamber and that the material within the first bin is not bridging. The controller depicts said at least one upper visual element to visually indicate the level of particulate material within the first bin.

According to yet another aspect of the particulate feeder system, the particulate feeder system additionally includes a fourth sensor supported and configured to generate a third flow signal in response to the absence of particulate material between the first metering member and the first inlet of the flow tube.

DETAILED DESCRIPTION OF THE PREFERRED EMBODIMENT

Figure 1:
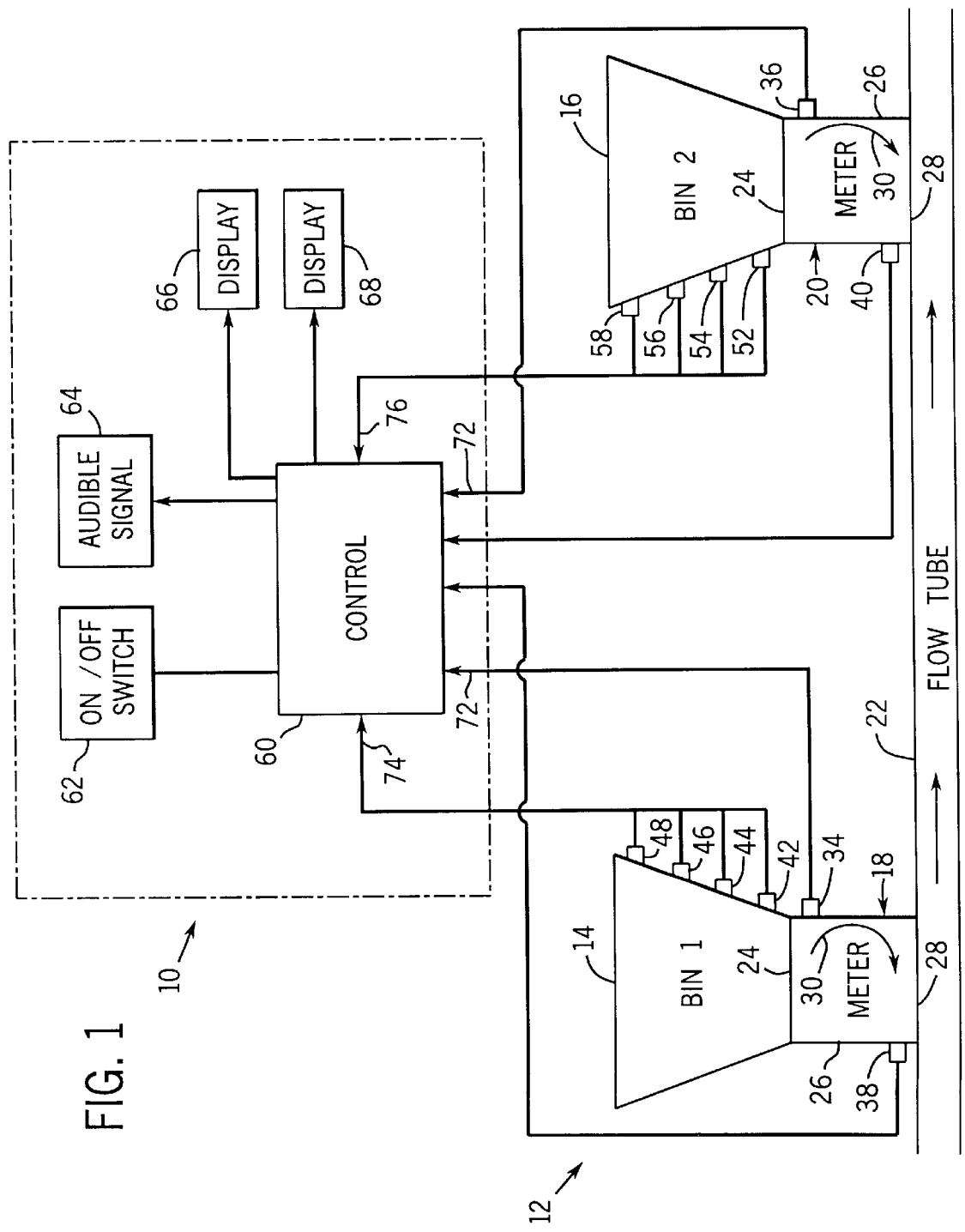
FIG. 1 is a schematic illustration of a flow monitoring system utilized with a particulate feeder.

FIG. 1 is a schematic illustration of flow monitoring system 10 utilized with particulate feeder 12. Particulate feeder 12 comprises a conventionally known particulate feeder including bins 14, 16, metering devices 18, 20 and particulate flow tube 22. Bins 14, 16 (also known as hoppers) which are configured for storing and dispersing particulate material, such as seed, fertilizer, insecticide and herbicide to metering devices 18 and 20 and ultimately to flow tube 22. Bins 14 and 16 each include an outlet 24 which communicates with an inlet of metering devices 18 and 20, respectively. Metering devices 18 and 20 meter particulate material from bins 14 and 16, respectively to flow tube 22 in controlled amounts. Each metering device 18 generally comprises a chamber 26 which communicates between the outlet 24 and a corresponding inlet 28 of flow tube 22. Metering devices 18 and 20 additionally include a metering member 30, which upon being rotated, carries particulate material within metering chamber 26 from outlet 24 to inlet 28.

Flow monitoring system 10 alerts the operator when the particulate material within either of bins 14 and 16 bridges such that material flow to flow tube 22 is interrupted. Flow monitoring system 10 generally includes sensors 34, 36, 38, 40, 42, 44, 46, 48, 52, 54, 56, 58, control 60, on/off switch 62, audible signal 64, and displays 66, 68. Sensors 34 and 36 are coupled adjacent to the interiors of metering devices 18 and 20 so as to sense the presence of particulate material between metering member 30 and outlet 24 of metering devices 18 and 20, respectively. Sensors 34 and 36 each generate flow signals in response to the absence of particulate material within metering devices 18 and 20, respectively, between outlet 24 and metering member 30. These flow signals are electrically transmitted to controller 60 as indicated by arrows 72. Sensors 38 and 40 are coupled adjacent to the interior of metering chambers 26 of metering devices 18 and 20, respectively, between metering member 30 and inlets 28 of flow tube 22. Sensors 38 and 40 are configured to generate flow signals in response to the absence of the particulate material between metering members 30 of metering devices 18 and 20, respectively, and inlets 28 of flow tube 22. The flow signals generated by sensors 38 and 40 are transmitted to controller 60.

Sensors 42, 44, 46 and 48 are each supported adjacent to bin 14 and are each configured to generate fill signals indicating a level of particulate material within bin 14. In particular, sensors 42, 44, 46 and 48 are each located adjacent to the interior of bin 14 at vertically spaced locations so as to sense the presence of particulate material at the particular level at which each sensor 42, 44, 46, and 48 is vertically located. For example, if bin 14 is completely full, sensor 48 will sense the presence of particulate material and will generate a fill signal indicating that bin 14 is completely full. If bin 14 is one-quarter full, sensor 42 will generate a fill signal while sensor 44 will not. Sensors 42, 44, 46 and 48 generate signals to indicate whether bin 14 is one-quarter, one-half, three-quarters or completely full. As can be appreciated, the degree of precision to which the level of particulate material within bin 14 is sensed will depend upon the number of sensors vertically positioned along the vertical height of bin 14. Fill signals from sensors 42, 44, 46 and 48 are transmitted to controller 60 as indicated by arrows 74. Sensors 52, 54, 56 and 58 are substantially identical to sensors 42, 44, 46 and 48, respectively, except that sensors 52, 54, 56 and 58 are coupled adjacent to the interior of bin 16 to sense the level of particulate material within bin 16. As with sensors 42, 44, 46 and 48, the fill signals generated by sensors 52, 54, 56 and 58 are transmitted to controller 60 as indicated by arrows 76.

Sensors 34, 36, 38 and 40 preferably comprise capacitive proximity sensors such as those manufactured and sold by TURCK, INC. at 3000 Campus Drive, Minneapolis, Minn. 55641. Alternatively, sensors 34, 36, 38 and 40 may comprise other well-known sensing devices, such as photoconductive sensors, reflective optical sensors, emitter-detector pairs and the like. Moreover, sensors 34, 36, 38 and 40 may alternatively comprise conventionally known "smart sensors" which read physical data and manage networking and which are sold by Dickey John Corporation at Auburn, Ill.

Sensors 42–48 and 52–58 preferably comprise conventionally known optical sensors such as emitter-detector pairs. Alternatively, sensors 42–48 and 52–58 may comprise other sensing devices such as capacitance sensors, reflective optical sensors, photoconductor sensors and the like. As will be understood by those skilled in the art, the signal transmitted to controller 60 by any of sensors 34–58 may be positive or negative in nature. For example, whereas the transmission of a certain electrical signal to controller 60 may indicate the sensed presence of particulate material, the lack thereof of such a signal would also act as a signal indicating the absence of particulate material.

Controller 60 comprises a conventionally known microprocessor device, such as Motorola MC68HC11, which is electronically coupled to each of sensors 34 through 58 and which is additionally coupled to an audible signal generating device 64 and displays 66, 68. Controller 60 is actuated by means of an on/off switch 62. Upon being actuated, controller 60 receives the flow signals generated by sensors 34, 36, 38 and 40 adjacent to bins 14 and 16. In response to receiving a flow signal from at least one of sensors 34, 36, 38 and 40, controller 60 generates an alarm signal which is transmitted to audible signal 64, whereby audible signal generator 64 produces an audible alarm to notify the operator that particulate material within at least one of bins 14, 16 or metering devices 18, 20 is bridging, or that outlets 24 of either of bins 14 or 16 is unintentionally closed. In addition to causing audible signal generator 64 to produce an audible alarm, controller 60 also transmits the alarm signal to at least one of displays 66, 68 to visually notify the operator of the problem. In the exemplary embodiment illustrated, controller 60 generates a first alarm signal in response to receiving a first flow signal from either sensor 34 or sensor 38 which causes display 66 to produce a first visual alarm. In response to receiving a second flow signal from either sensor 36 or sensor 40, controller 60 generates a second alarm signal which causes display 68 to produce a visual alarm to notify the operator of the problem. As a result, controller 60 not only alerts the operator of a particulate material bridging the problem, but also informs the operator as to which bin 14, 16 the bridging problem is occurring in.

Because sensors 34 and 36 are each located between outlets 24 of bins 14 and 16 and metering members 30 of metering devices 18, 20, sensors 34 and 36 indicate bridging of particulate material within bins 14 and 16. Because sensors 38 and 40 are located between metering members 30 of metering devices 18, 20 and inlets 28 of flow tube 22, sensors 38 and 40 additionally indicate bridging or taking of material within metering devices 18 and 20. Due to the combination of sensors 34 and 38 as well as sensors 36 and 40, the exact location of the bridging of particulate material in either bins 14 and 16 or metering devices 18 and 20 can be determined. Although not illustrated, monitoring system 10 may additionally include two additional visual displays to specifically indicate not only whether bin 14 or bin 16 and its associated metering device is encountering a bridging problem but also to specifically indicate whether the bridging problem is occurring within bin 14 or 16 or within metering device 18 or metering device 20.

In addition to alerting the operator of a bridging problem, flow monitoring system 10 also provides single visual displays which simultaneously inform the operator as to the level of particulate material within either of bins 14 or 16 as well as whether the particulate material within bins 14 or 16 is bridging. In particular, controller 60 receives the fill signals from sensors 42, 44, 46 and 48 with respect to bin 14 as well as the fill signals from sensors 52, 54, 56 and 58 with respect to bin 16. As discussed above, controller 60 also receives flow signals from sensors 34 and 38 with respect to bin 14 and from sensors 36 and 40 with respect to bin 16. Controller 60 utilizes these signals to produce a single visual display, in a conventionally known manner, that simultaneously indicates the amount of material within either of bins 14 or 16 and whether the material within either of bins 14 or 16 is bridging. A single visual display graphically illustrating information with respect to bin 14 is depicted in display 66 while the visual display depicting information relating to bin 16 is depicted in display 68. As a result, with a single glance at either of displays 66 or 68, the operator can instantaneously determine whether bins 14 or 16 are running low on material and need to be filled or whether the particulate material within either of bins 14 or 16 above metering devices 18 and 20 is bridging such that flow is being interrupted. The operator can also determine the exact location of the problem.

Figure 2:
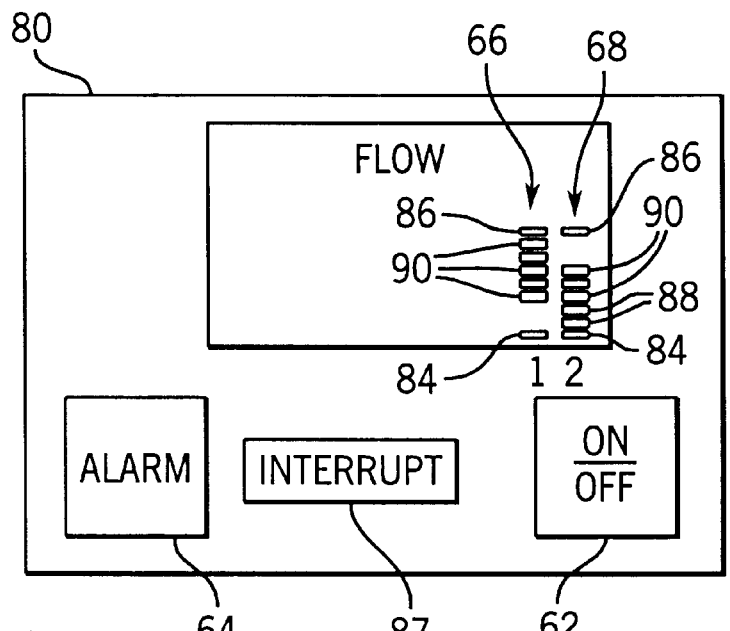
FIG. 2 is a front elevational view of a visual display of the flow monitoring system.

FIG. 2 illustrates monitor 80 which incorporates controller 60 (not shown), on/off switch 62, audible signals 64 and displays 66, 68. It is further shown by FIG. 2, monitor 80 additionally includes alarm acknowledgment switch 87. The alarm acknowledgment switch 87 is electronically coupled to controller 60. Actuation of alarm acknowledgment switch 87 interrupts the generation of the alarm signal by controller 60 to interrupt the audible alarm produced by audible signal generator 64. As a result, once the operator has become aware of the potential bridging problem, the operator may terminate the alarm as desired.

As best shown by FIG. 2, each of visual displays 66, 68 provides a graphical illustration representing information regarding information obtained from sensors 34, 38 and 42 through 48 relating to bin 14 and metering device 18 as well as sensors 36, 40 and 52 through 58 relating to bin 16 and metering device 20. Each of visual displays 66, 68 includes border visual elements 84, 86 which represent the upper and lower perimeters of visual display 66 and 68, respectively.

Visual display 66 also includes lower visual elements 88 and upper visual elements 90. Lower visual elements 88 and upper visual elements 90 each comprise a plurality of pixels, formed into horizontal bars, which are depicted by controller 60 (shown in FIG. 1) based upon the flow signals and the fill signals together. Controller 60 depicts lower visual elements 88 to visually indicate the presence of particulate material within metering devices 18, 20 which also informs the operator as to whether material within the first bin is bridging. Controller 60 depicts upper visual elements 90 to visually indicate the level of particulate material within bins 14, 16. In the illustrated example in FIG. 2, controller 60 (shown in FIG. 1) has received flow signals from sensors 34 and 38 indicating that material within bin 14 is bridging. At the same time, controller 60 has received fill signals from sensors 42, 44, 46 and 48 indicating that bin 14 is full. As a result, controller 60 produces signals, in a conventionally known manner, to cause the illumination and display of upper visual elements 90 to indicate that bin 14 is full. At the same time, controller 60 does not cause the depiction of lower visual elements 88 to thereby indicate that material within bin 14 is bridging.

With respect to bin 16 and metering device 20, controller 60 is receiving flow signals from sensors 34 and 40 indicating that particulate material is present within metering device 20 and is also receiving fill signals from sensors 52 and 54 indicating the bin 16 is half full. Accordingly, based upon the signals received from sensors 36, 40 and 52 through 58, controller 60 produces control signals, in a conventionally known manner, to depict lower visual elements 88 and to depict only those upper visual elements 90 which correspond to the sensors from which no fill signal was received (i.e. sensors 56 and 58). As a result, controller 60 controls visual displays 66 and 68 to generate single, visual displays which simultaneously inform the operator as to (1) whether or not particulate material within either of bins 14, 16 is bridging, (2) where the particulate material is bridging and (3) the amount of particulate material remaining in both bins 14 and 16. This simple and concise depiction of information to the operator immediately alerts the operator to any problem and enables the operator to devote more attention to other critical information.

Figure 3:
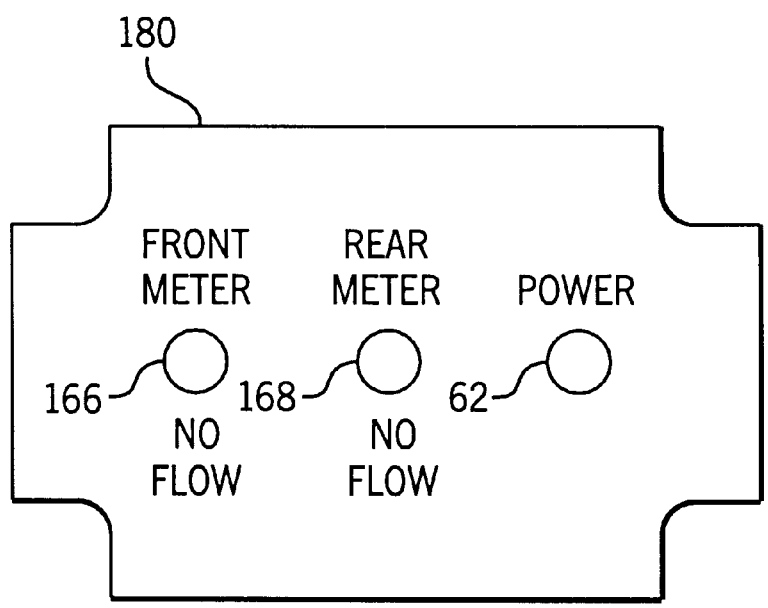
FIG. 3 is a front elevational view of an alternate embodiment of the visual display of FIG. 2.

FIG. 3 is a front elevational view of monitor 180, an alternate embodiment of monitor 80 shown in FIG. 2. As with monitor 80, monitor 180 incorporates controller 60 and audible signal generation device 64 (not shown) as well as on/off switch 62 and visual displays 166, 168. Visual displays 166 and 168 are similar to visual displays 66 and 68 except that visual displays 166 and 168 illuminate in response to receiving alarm signals from controller 60. In particular, in response to receiving flow signals from sensors 34 and 38 indicating the absence of particular material within metering device 18, controller 60 generates an alarm signal which causes displays 166 to illuminate to inform the operator that no material flow is occurring within metering device 18. Alternatively, if controller 60 is receiving flow signals from sensors 34 and 38 indicating that material is flowing within metering device 18, controller 60 does not illuminate visual display 166 to also inform the operator that there is no bridging problem. Controller 60 and visual display 168 rate similarly with respect to information regarding bin 16.

Figure 4:
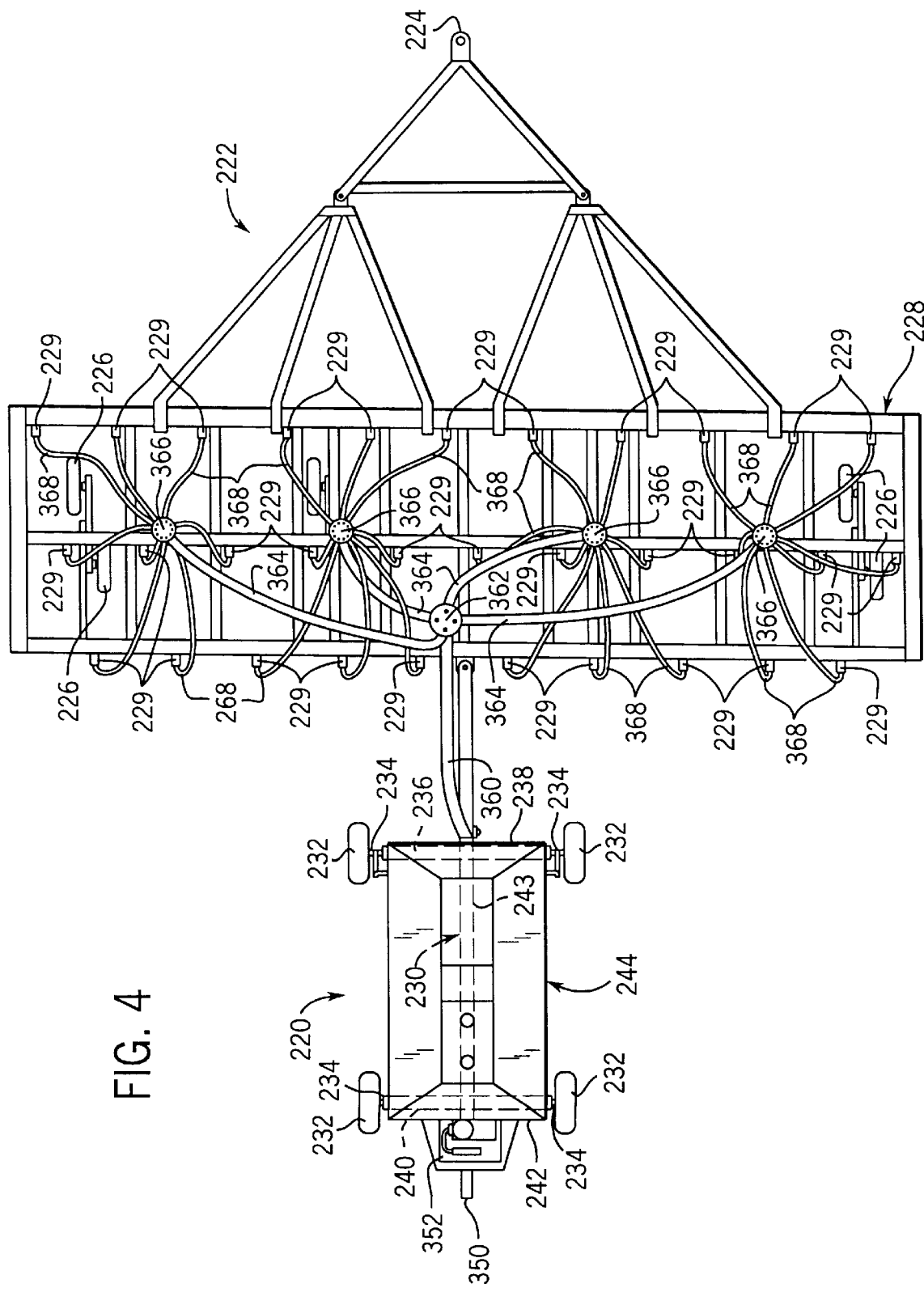
FIG. 4 is a top plan view of a particulate feeder incorporating the flow monitoring system.
Figure 5:
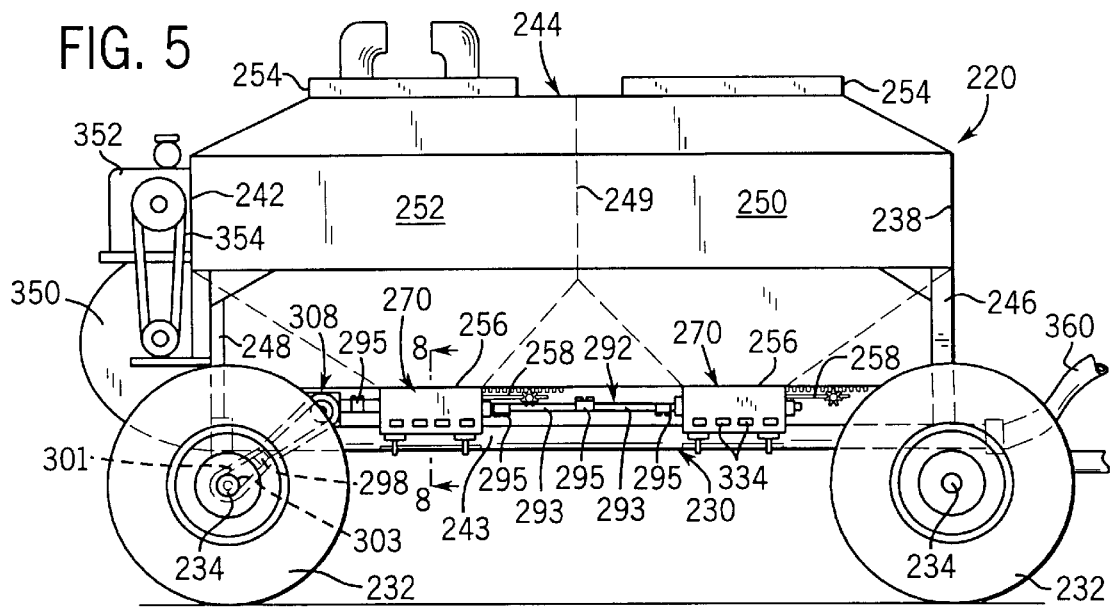
FIG. 5 is a side elevational view of the particulate feeder of FIG. 4.
Figure 6:
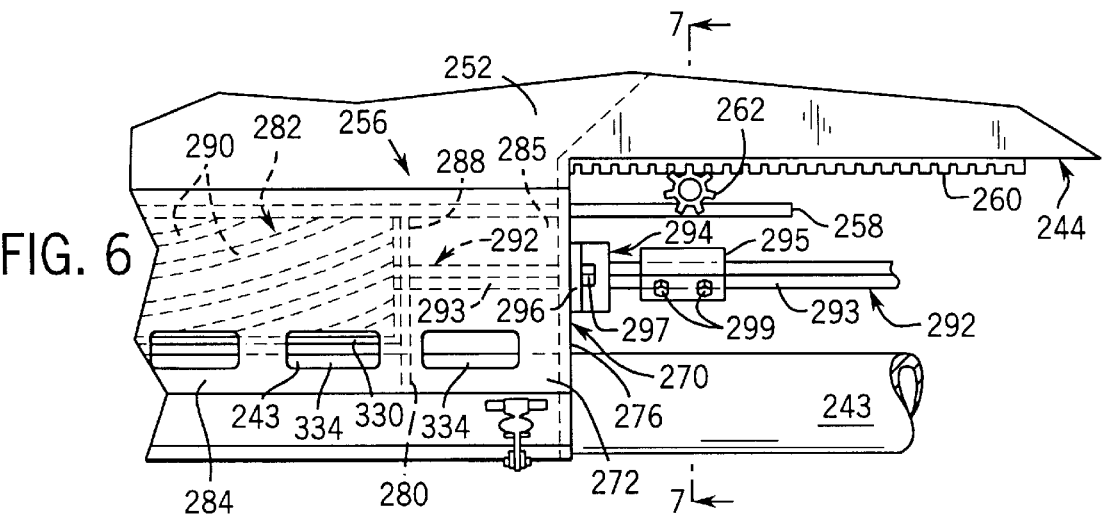
FIG. 6 is an enlarged fragmentary view of a portion of a metering device of the particulate feeder of FIG. 4.

FIGS. 4–6 illustrate an exemplary particulate feeder 220 incorporating flow monitoring system 210. FIG. 4 shows a particulate feeder 220 hitched to a particulate distribution implement 222, which is in turn hitched at its forward end 224 of a prime mover or tractor (not shown). The implements, as viewed in FIG. 4, would be pulled from left to right by the tractor. The particulate distribution implement 222 shown is a standard 'deep tiller'-type implement which is movably supported on wheels 226 mounted under its frame 228 and has a plurality of spaced apart tillers 229 mounted under the frame 228 to engage and work the ground.

A main frame 230 supports the particulate feeder 220, with a plurality of ground engaging wheels 232 rotatably mounted on the main frame 230 to movably support the main frame 230 and particulate feeder 220 on the ground, as best shown in FIG. 5. Each wheel 232 is shafted on an axle 234 and suitable bearing means (not shown) are provided to allow the wheel 232 to roll freely. The axles 234 are mounted on laterally extending members 236 and 240 of the main frame 230 and aligned so that the wheels 232 track substantially parallel paths in operation. Laterally extending member 236 comprises a portion of the main frame 230 proximate a forward end 238 of the particulate feeder 220 and laterally extending member 240 comprises a portion of the main frame 230 proximate a rearward end 242 of the particulate feeder 220. In this description, 'forward' and 'rearward' are used to describe the relative components of the invention as viewed from right to left as in FIGS. 4 and 5. It is understood that the particulate feeder 220 could be operably hitched behind a tractor at either its forward end 238 or its rearward end 242 so that the use of these directional terms in this description is merely for discussion purposes.

A rigid elongated tube 243 extends longitudinally as the primary longitudinal portion of the main frame 230. The tube 243 extends from the forward end 238 to the rearward end 242 of the particulate feeder 220, with the laterally extending members 236 and 240 fixedly mounted perpendicularly thereto. In operation, the elongated tube 243 is a portion of a particulate distribution system for dispensing particulate to the surface being worked.

As best shown in FIG. 5, an air blower or fan 350 is mounted adjacent the rearward end 242 of the particulate feeder 220. The fan 350 is driven by conventional drive means, such as a gasoline engine 352 operably coupled to the fan by a drive belt 354. The fan 350 provides means for forcing air through the elongated tube 243 to provide a fluid medium for transporting particulate away from the hoppers and toward the surface being worked. Once the particulate has been metered into the elongated tube 243 of the distribution system, the air entrained particulate is then conveyed through the elongated tube 243 to a distribution tube 360. At least one distributor manifold is positioned downstream in the path of the distribution tube 360 to direct the particulate to a plurality of surface applicators.

A preferable arrangement for connecting the distribution system to the elongated tube 243 is shown in FIG. 4. The distribution tube 360 connects the elongated tube 243 to a primary manifold 362, which in turn distributes particulate to a plurality of secondary distribution tubes 364. Each secondary distribution tube 364 leads to a secondary manifold 366, which distributes the particulate to a plurality of applicator distribution hoses 368.

As shown in FIG. 5, a particulate container bin 244 is supported on the main frame 230 by forward and rearward support struts 246 and 248 (which are fixedly secured to the laterally extending members 236 and 240, respectively). As illustrated in FIG. 5, the particulate container bin 244 can be divided into a plurality of hoppers by positioning divider means such as a divider wall 249 within the container bin 244. The container bin 244 is thus divided into a forward hopper 250 and a rearward hopper 252. Each hopper is generally rectangular with an access door 254 at its upper end and sloped walls adjacent its lower end to form a rectangular funnel arrangement leading to a particulate discharge outlet 256.

Figure 7:
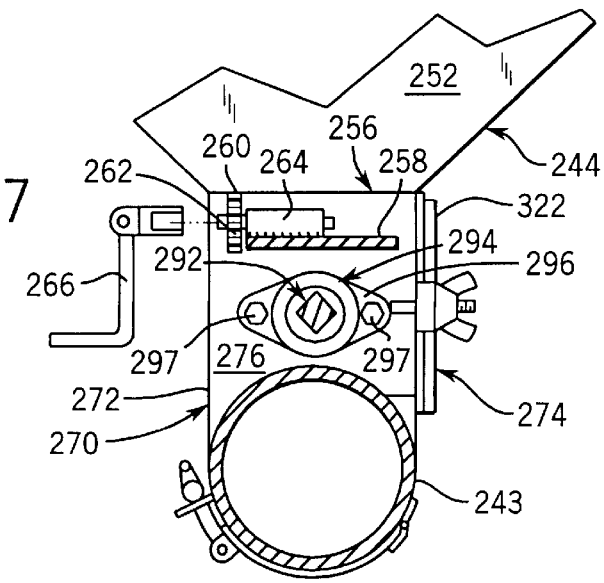
FIG. 7 is a sectional view taken along lines 7—7 of FIG. 6.
Figure 8:
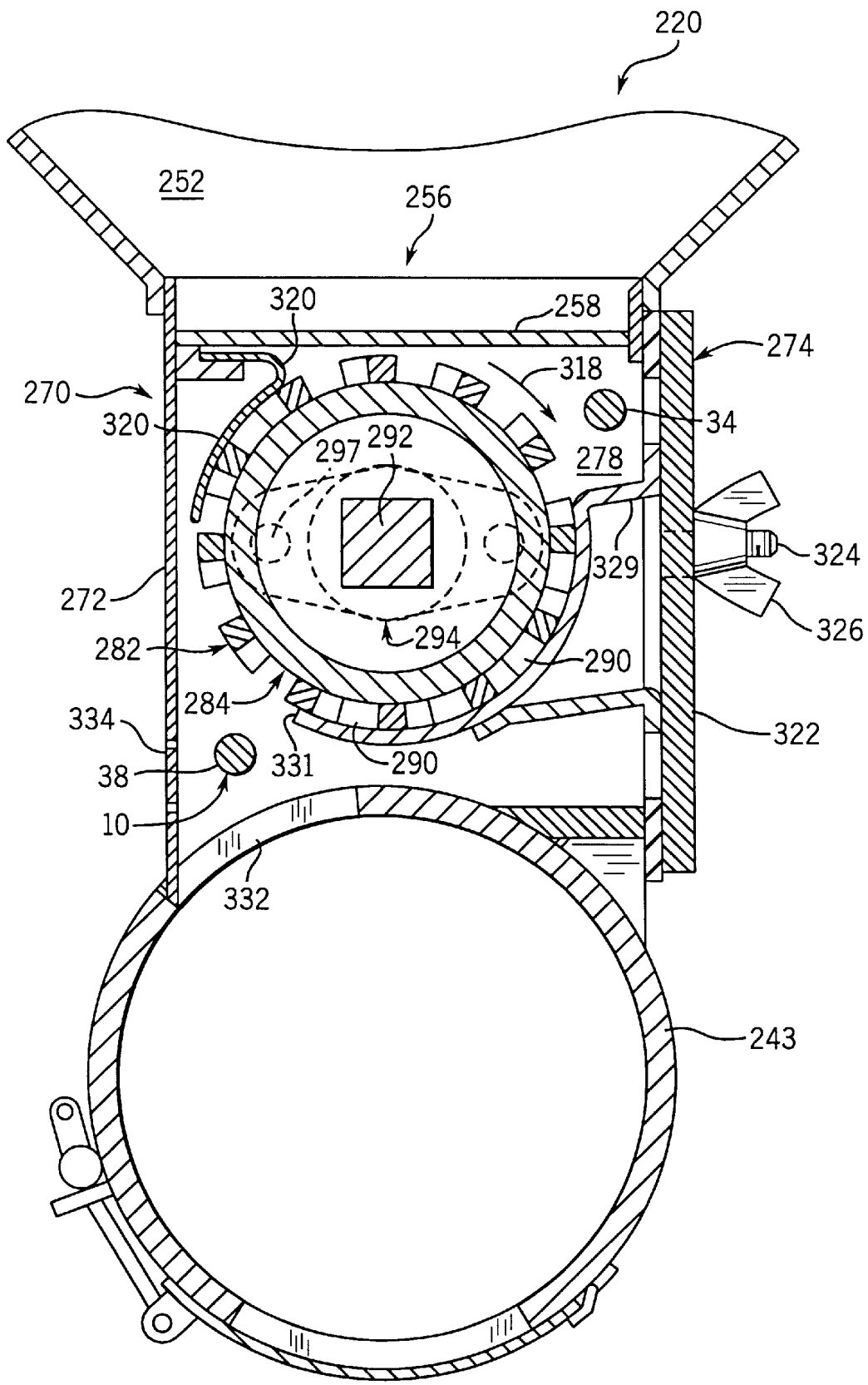
FIG. 8 is a sectional view taken along lines 8—8 of FIG. 6.

As shown in FIGS. 6–8, a sliding door 258 is mounted adjacent the discharge outlet 256 to selectively open and close the outlet 256 to the passage of particulate. Each sliding door 258 is provided with means for moving the sliding door relative to the particulate outlet 256 so that the position of the door 258 is selectively variable from a first open position to a second closed position to control the size of the particulate outlet 256. Preferably, the moving means comprises a rack and pinion-type arrangement wherein a rack 260 is mounted on the particulate container bin 244 and a pinion 262 is rotatably mounted in a sleeve 264 secured to each door 258. The teeth of the pinion 262 are aligned with the teeth of the rack 260 so that rotation of the pinion 262 on its shaft moves the door 258 relative to the particulate outlet 256.

As viewed in FIG. 6, a clockwise rotation of the pinion 262 causes the door 258 to move to the left and cover or close the particulate outlet 256. Rotation of the pinion 262 in a counterclockwise direction moves the door 258 to the right and opens the particulate outlet 256. As illustrated in FIG. 7, a crank means 266 can be selectively secured upon the pinion 262 to facilitate rotation of the pinion 262 to open or close the sliding door 258. The sliding door 258 is dimensioned to fully seal the discharge outlet 256 when in its closed position to prevent particulate from passing through the outlet 256.

A housing 270 extends from the discharge outlet 256 of each hopper to the elongated tube 243, as shown. The housing 270 is generally rectangular in horizontal cross section and corresponds to the rectangular opening defined by the particulate outlet 256.

A particulate metering cylinder 282 is rotatably mounted on a longitudinal axis in the first chamber 284 in the housing 270. The metering cylinder 282 has a first end 286 and a second end 288 defining a longitudinal axis of rotation for the metering cylinder 282. A plurality of elongated ribs 289 extend from the first end 286 to the second end 288 of the metering cylinder on its outer cylindrical side, as best shown in FIG. 8. The ribs 289 define a plurality of elongated troughs 290 therebetween. Preferably, the elongated troughs 290 on the outer side of the metering cylinder 282 are slanted relative to the longitudinal axis of rotation of the metering cylinder 282 (as shown in FIG. 6) to facilitate the metering of particulate in a more orderly and uniform fashion by the particulate metering cylinder 282.

As stated, the metering cylinder 282 is rotatably mounted on its longitudinal axis. A cylinder drive shaft 292 is rotatably supported by bearing collars 294 adjacent each end of the housing 270. Each bearing collar 294 is secured to its respective end wall 276 and 278 of the housing 270 by a bearing mount plate 296 and suitable fasteners 297 which allow rotation of bearing collars 294. The drive shaft 292 passes through the metering cylinder 282 from its first end 286 to its second end 288 and passes completely through the housing 270 longitudinally (both chambers 284 and 285), as shown in FIG. 6. Preferably, the drive shaft 292 is comprised of a plurality of drive shaft sections 293. The shaft sections 293 are secured end to end along a single axis of rotation, as best shown in FIGS. 5, 6, by suitable fastening means, such as a plurality of connecting collars 295. Each connecting shaft 295 has two fasteners, such as screws 299, to secure the shaft 295 to adjoining ends of the shaft 292.

The metering cylinder 282 is mounted on the drive shaft 292 to rotate with the drive shaft 292 when it is rotated. As shown, one way to accomplish this coupled rotation is by use of a square drive shaft (in cross section) fitted in a square passageway in the metering cylinder 282. Other means of obtaining coupled rotation between the drive shaft 292 and metering cylinder 282, such as using a keyway on the shaft, are also possible.

In the preferred embodiment, the drive shaft 292 is rotatably driven off of one of the wheels 232 of the particulate feeder 220. As shown in FIGS. 5, a drive gear 298 engages an endless chain 301 which engages a drive sprocket 303 axially secured on one of the wheels 232 (as best shown in FIG. 4). Rotation of the wheel 232 rotates the drive sprocket 303 which drives the chain 301 to rotate the drive gear 298. Alternatively, drive gear 298 may be driven by hydraulic, pneumatic or other mechanical means. The drive gear 298 is, in turn, secured to a drive rod 300 which is rotatably mounted on bearing means 302, 304 and 306. The bearing means are mounted on brackets 307 secured to one of the laterally extending members (such as member 240) of the main frame 230. The drive rod 300 is operably connected to a right angle gear box 308 by means of circular gears 310 and 312 and endless chain 314. The right angle gear box 308 causes rotation of the drive rod 300 to rotate drive shaft 292 by standard means (not shown).

FIG. 8 shows the configuration (in lateral cross-section) of the first chamber 284 of the housing 270. The metering cylinder 282 is mounted under the sliding door 258 and rotates on the drive shaft 292 in a clockwise direction as shown by arrow 318. A particulate shield 320 is mounted adjacent an upper edge of the longitudinal side wall 272 of the housing 270 and extends the full longitudinal length of the first chamber 284 and covers a limited arcuate range of the outer side of the metering cylinder 282 sufficient to prevent particulate flow against rotation of the metering cylinder 282. The particulate shield 320 prevents particulate from flowing downwardly against the rotation of the metering cylinder 282 and guides the particulate into the troughs 290 of the metering cylinder 282.

The longitudinal side wall 274 of the housing 270 has a removable panel 322 extending its full longitudinal length, as shown in FIG. 6. The panel 322 is secured to the housing 270 by quick removing fastener means, such as threaded rods 324 and wing nuts 326. Sealing means, such as a gasket 328 is provided on the inner surface of the panel 322 to prevent leakage of particulate from the chambers of the housing 270 when the panel 322 is secured in place. The threaded rods 324 are fixedly secured to the end wall 276 and 278 of the housing 370 to extend laterally through generally vertical slots 325 in the removable panel 322 (see FIG. 8). Thus, the panel 322 is slidably adjustable on the housing 270.

Mounted on the inner side of the panel 322 is a curved particulate guide portion 330 for maintaining and guiding particulate into engagement with the metering cylinder 282. The guide portion 330 is curved from a particulate contact end 329 to a particulate drop end 331 to correspond to the curve of the outer cylindrical side of the metering cylinder 282 and regulate the amount of particulate engaged by the metering cylinder 282. Because of the slots 325, the position of the guide portion 330 is adjustable relative to the metering cylinder 282 to aid in controlling the amount of particulate engaged by the metering cylinder 282.

As best shown by FIG. 8, particulate feeder 220 includes flow monitoring system 10. In particular, FIG. 8 illustrates hopper 252 provided with sensors 34 and 38. Sensor 34 is mounted to housing 270 so as to partially project between outlet 256 of hopper 252 and metering member or cylinder 282. As discussed above, sensor 34 generates a flow signal in response to the presence of particulate material between outlet 256 and metering cylinder 282. This flow signal is transmitted to controller 60 (shown in FIG. 1), whereby controller 60 provides alarm signals to audible signal generator 64 and display 66. As further shown by FIG. 8, sensor 38 is mounted to housing 270 of particulate feeder 220 so as to partially project into the space between metering member or cylinder 282 and inlet 332 of tube 243. As also discussed above, sensor 38 generates a flow signal in response to the absence of particulate material between metering cylinder 282 and inlet 332. This flow signal is transmitted to controller 60, whereby controller 60 generates an alarm signal which is transmitted to audible signal generator 64 and display 66. Although not illustrated, hopper 252 also is provided with sensors 42, 44, 46 and 48 along the vertical height of hooper 252 to sense the amount of particulate material within hopper 252. Similarly, the metering device below hopper 250 is also provided with sensors 36 and 40 while hopper 250 is provided with vertically spaced sensors 52, 54, 56 and 58. As a result, the flow monitoring system 10 alerts the operator as to (1) whether or not particulate material within either of hoppers 250 and 252 are bridging, (2) where the particulate material is bridging and (3) the amount of particulate material remaining in both hoppers 250 and 252. This simple and concise depiction of information to the operator immediately alerts the operator to any problem and enables the operator to devote more attention to other critical information.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A flow monitoring system for a particulate feeder having first and second metering devices that meter particulate material from first and second bins, respectively, to a common material flow tube, the monitoring system comprising:
    a first sensor supported and configured to generate a first flow signal in response to the absence of particulate material within the first metering device;
    a second sensor supported and configured to generate a second flow signal in response to the absence of particulate material within the second metering device;
    a controller coupled to the first and second sensors and configured to generate an alarm signal in response to receiving at least one of the first and second flow signals; and
    a notification device coupled to the controller and configured to produce an alarm in response to the alarm signal.

2. The monitoring system of claim 1, wherein the first sensor comprises a capacitive proximity sensor.

3. The monitoring system of claim 1, wherein the notification device is configured to produce an audible alarm in response to the alarm signal.

4. The monitoring system of claim 1, wherein the notification device is configured to produce a visual alarm in response to the alarm signal.

5. The monitoring system of claim 1, wherein the controller generates a first alarm signal in response to receiving the first flow signal and a second alarm signal in response to receiving the second flow signal, wherein the notification device produces a first alarm in response to the first alarm signal and a second alarm in response to the second alarm signal.

6. The monitoring system of claim 5, wherein the notification device produces a first visual alarm in response to a first flow signal and a second visual alarm in response to the second flow signal.

7. The monitoring system of claim 1, including a third sensor supported adjacent the first bin and configured to generate a first fill signal indicating a level of particulate material within the first bin, wherein the controller is coupled to the third sensor and generates a first visual display based on the first fill signal and the first flow signal to simultaneously indicate the level of material within the first bin and whether the material within the first bin is bridging.

8. The monitoring system of claim 7, including a fourth sensor supported adjacent the second bin and configured to generate a second fill signal indicating a level of particulate material within the second bin, wherein the controller is coupled to the fourth sensor and generates a second visual display based on the second fill signal and the second flow signal to simultaneously indicate the level of material within the second bin and whether the material within the second bin is bridging.

9. The monitoring system of claim 7, wherein the first visual display comprises a lower visual element and at least one upper visual element above the lower visual element, wherein the controller depicts the lower visual element to visually indicate the presence of particulate material within the first metering device and that the material within the first bin is not bridging and wherein the controller depicts said at least one upper visual element to visually indicate the level of particulate material within the first bin.

10. A flow monitoring system for a particulate metering system having a first metering device metering particulate material from a first bin to a particulate material flow tube, the monitoring system comprising:
    a first sensor supported adjacent the bin and configured to generate a first fill signal indicating a level of particulate material within the bin;
    a second sensor supported adjacent the first metering device and configured to generate a first flow signal in response to the absence of material within the first metering device; and
    a controller coupled to the first and second sensors and configured to generate a single, visual display based on the first fill signal and the first flow signal to simultaneously indicate the amount of material within the first bin and whether the material within the first bin is bridging.

11. The monitoring system of claim 10, wherein the visual display comprises a lower visual element and at least one upper visual element above the lower visual element, wherein the controller depicts the lower visual element to visually indicate the presence of particulate material within the first metering device and that the material within the first bin is not bridging, and wherein the controller depicts said at least one upper visual element to visually indicate the level of particulate material within the first bin.

12. The monitoring system of claim 10, wherein the particulate metering system includes a second metering device metering particulate material from a second bin to the particulate material flow tube, wherein the flow monitoring system includes:

a third sensor coupled to the second metering device and configured for generating a second flow signal in response to the absence of particulate material within the second metering device, wherein the controller is coupled to the third sensor and is configured to generate a first alarm signal in response to receiving at least one of the first and second flow signals from the first and third sensors.

13. The monitoring system of claim 12, including a fourth sensor supported adjacent the second bin and configured to generate a second fill signal indicating a level of particulate material within the second bin, wherein the controller is coupled to the fourth sensor and generates a second visual display based on the second fill signal and the second flow signal to simultaneously indicate the level of material within the second bin and whether the material within the second bin is bridging.

14. The monitoring system of claim 13, wherein the second visual display has a lower visual element and at least one upper visual element above the lower visual element, wherein the controller depicts the lower visual element to visually indicate the presence of particulate material within the second metering device and that the material within the second bin is not bridging and wherein the controller depicts said at least one upper visual element to visually indicate a level of particulate material within the second bin.

15. A particulate feeder system comprising:

a first bin configured for containing a first particulate material, the first bin including a first outlet;

a second bin configured for containing a second particulate material, the second bin including a second outlet;

a particulate flow tube having a first inlet, a second inlet and an outlet;

a first metering chamber interconnecting the first outlet of the first bin and the first inlet of the tube;

a first metering member rotatably supported within the first metering chamber, wherein the first metering member is configured to carry particulate material from the first outlet of the first bin to the first inlet of the tube;

a second metering chamber interconnecting the second outlet of the second bin to the second inlet of the tube;

a second metering member rotatably supported within the second metering chamber, wherein the second metering member is configured to carry a particulate material from the second outlet of the second bin to the second inlet of the tube;

a first sensor supported and configured to generate first flow signals in response to the absence of particulate material between the first outlet of the first bin and the first metering member;

a second sensor supported and configured to generate second flow signals in response to the absence of particulate material between the second outlet of the second bin and the second metering member;

a controller coupled to the first and second sensors and configured to generate an alarm signal in response to receiving at least one of the first and second flow signals; and a notification device coupled to the controller and configured to produce an alarm in response to the alarm signal.

16. The system of claim 15, wherein the controller is configured to generate a first alarm signal in response to receiving the first flow signals and a second alarm signal in response to receiving the second flow signals and wherein the notification device is configured to produce a first alarm in response to the first alarm signal and a second alarm in response to the second alarm signal.

17. The system of claim 16, wherein the notification device produces a first visual alarm in response to the first flow signal and a second visual alarm in response to the second flow signal.

18. The system of claim 16, including a third sensor supported and configured to generate third flow signals in response to the absence of particulate material between the first metering member and the first inlet of the tube.

19. The system of claim 18, including a fourth sensor supported adjacent the first bin and configured to generate a first fill signal indicating a level of particulate material within the first bin, wherein the controller is coupled to the fourth sensor and generates a first visual display based on the first fill signal and the first flow signals simultaneously indicate the level of material within the first bin and whether the material within the first bin is bridging.

20. The system of claim 19, wherein the first visual display comprises a lower visual element and at least one upper visual element above the lower visual element, wherein the controller depicts a lower visual element to visually indicate the presence of particulate material within the first metering device and that the material within the first bin is not bridging and wherein the controller depicts said at least one upper visual element to visually indicate the level of particulate material within the first bin.

* * * * *